United States Patent

Ferber

[11] Patent Number: 6,131,070
[45] Date of Patent: Oct. 10, 2000

[54] METHOD OF GENERATING A FOLD DISTRIBUTION AND OF EVALUATING A SEISMIC SURVEY

[75] Inventor: Ralf-Gunter Ferber, Horsham, United Kingdom

[73] Assignee: Schlumberger Technology Corporation, Houston, Tex.

[21] Appl. No.: 09/284,048

[22] PCT Filed: Oct. 9, 1997

[86] PCT No.: PCT/GB97/02791

§ 371 Date: Apr. 6, 1999

§ 102(e) Date: Apr. 6, 1999

[87] PCT Pub. No.: WO98/15849

PCT Pub. Date: Apr. 16, 1998

[30] Foreign Application Priority Data

Oct. 10, 1996 [GB] United Kingdom ............... 9621141

[51] Int. Cl.[7] .................................................. G01V 1/36
[52] U.S. Cl. .................................. 702/14; 702/10
[58] Field of Search ................. 367/73; 702/10, 702/17, 18, 14

[56] References Cited

U.S. PATENT DOCUMENTS 3,746,122  7/1973  Davis .
4,933,912  6/1990  Gallagher .
5,450,370  9/1995  Beasley .

FOREIGN PATENT DOCUMENTS 0 527 030  2/1993  European Pat. Off. .

OTHER PUBLICATIONS

Slawson, "DMO implications for 3–D Survey Design", SEG 1995, pp. 935–936.
Beasley, "Quality Assurance of Spatial Sampling for DMO", SEG 1993, pp. 544–547.

Primary Examiner—Donald E. McElheny, Jr.
Attorney, Agent, or Firm—William B. Batzer; John H Bouchard

[57] ABSTRACT

Method of generating a fold distribution for a number of seismic sources and seismic receivers, comprises: (a) selecting a Common Mid-Point location; (b) selecting a dip within a first predetermined range and a strike within a second predetermined range; (c) determining the fold for the selected dip and strike at the selected location; and (d) repeating the step (c) for a number of different dips within the first predetermined range and a number of strikes within the second predetermined range. Thus producing a Dip Movement Dip Coverage Spectrum for evaluating the quality of seismic data obtained from a given survey geometry. The invention obviates or mitigates the problems of the prior art by obtaining a true representation of the fold distribution.

11 Claims, 7 Drawing Sheets

METHOD OF GENERATING A FOLD DISTRIBUTION AND OF EVALUATING A SEISMIC SURVEY

The present invention relates to a method of generating a fold distribution and to a method of evaluating a seismic survey. Such methods may be used to produce a Dip Moveout Dip Coverage Spectrum (DDCS) for evaluating the quality of seismic data obtained from a given survey geometry.

In seismic exploration, acoustic signals produced by a seismic source travel downwardly into the earth and are reflected back to a number of seismic receivers, such as geophones for use on land or hydrophones for marine seismic. The digitally recorded signals received by the receivers are normally referred to as traces and are processed in order to yield information about the nature of the earth below the area being investigated. For instance, these signals carry information indicating the structure of reflective layers such as boundaries between different types of rocks.

The procedure of converting recorded traces into a subsurface image is typically divided into several steps, each producing an intermediate result which may be useful. Ideally all the reflected signals are transformed (or "migrated") to their actual subsurface location, and are there combined, by summation, with all data corresponding to the same location. This procedure may in principle be performed in a single step, referred to as "prestack migration" by those skilled in the art. However, in order to facilitate parameter selection and reduce computational requirements, this procedure is usually subdivided into four steps.

Firstly, two corrections are made to eliminate the effects of source-receiver separation (or offset). The first is a velocity dependent correction known as normal moveout (NMO), which assumes reflections occur at horizontal interfaces. The other is a velocity independent correction known as dip moveout (DMO), which compensates for the mispositioning due to any inclination (or dip) of the reflecting interfaces. The theory of dip moveout is generally based on constant velocity and uniform receiver geometries, but it is sufficiently accurate for most cases where velocity varies. Applications of NMO and DMO produce traces which simulate the recording of a survey with the source and receiver at the same location (zero offset traces) and permit the summation (or stacking) of traces with the same or similar locations to produce the "stack". As well as reducing the number of traces for subsequent processing, this step improves the signal-to-noise ratio of the data. Finally, reflectors are moved to their correct positions by a zero offset migration of the stack.

In the case of 3D seismic data, in which the survey has been conducted with the sources and receivers arranged to cover an area of the surface and so obtain data from a 3-dimensional portion of the earth, the traces are collected into geometric cells (or bins) which make up a regular grid, either at the surface or some reference plane defined for processing purposes. The stack is partly obtained by summing traces which fall within the same cell, to generate a single trace for each grid location. Due to the DMO correction, traces which fall within neighbouring cells also contribute to the stack if the corresponding line from the source to the receiver group hits the output cell.

It is sometimes difficult to obtain a uniform distribution of sources and receivers due to obstructions, such as buildings or roads or, in the case of seismic marine exploration, due to cable drift or drilling and production platforms.

U.S. Pat. No. 5,450,370 discloses a process for assessing a proposed geometry of sources and receivers in order to avoid data shadow zones and over- or under-sampled data zones, which can be caused by a non-uniform receiver distribution, and to optimise the resulting image. The process comprises, for a given dipping reflector, the steps of generating for a fold distribution a range of source-receiver azimuths and a range of angles of dip and analysing the results to detect undesired shadow zones. In the event that such a zone is found, the receiver distribution is reconfigured and the process is repeated until no undesired singularities are found.

However, the above process detects apparent shadow zones, since the angle of dip used is an apparent angle of dip of the dipping reflector. Furthermore, when the line along which the source and receiver lie is parallel to the plane of the dipping reflector, the dipping reflector is perceived as having zero dip. Therefore, it is not possible to obtain a true representation of the fold distribution.

It is therefore an object of the present invention to obviate or mitigate the above problem associated with the calculation of a time dip.

According to a first aspect of the invention, there is provided a method as defined in the appended claim 1.

According to a second aspect of the invention, there is provided a method as defined in the appended claim 4.

According to a third aspect of the invention, there is provided a method as defined in the appended claim 7.

Preferred embodiments of the invention are defined in the other appended claims.

The invention will now be described, by way of example, with reference to the accompanying drawings, in which.

Throughout this description, like parts have been assigned like references.

In order to facilitate understanding of the description, a 2D example is initially described hereinbelow.

Figure 1:
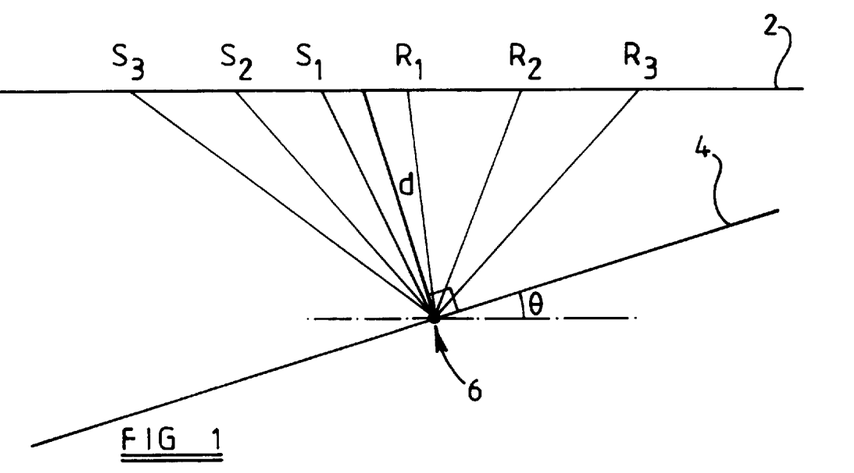
FIG. 1 is a 2 dimensional (2D) land survey area having a subsurface to be studied according to an embodiment of the present invention.

Referring to FIG. 1, a seismic survey area 2 comprises a dipping reflector 4 located beneath the surface of the survey area 2 and having an angle of dip θ. A plurality of seismic sources such as $S_1$, $S_2$, and $S_3$ and a plurality of seismic receivers such as $R_1$, $R_2$, and $R_3$, for example geophones or hydrophones, are located on the surface of the survey area 2.

For an arbitrarily selected Common Mid-Point (CMP) 6 at a depth, d, a trace from each of a number of source and receiver pairs $S_1/R_1$, $S_2/R_2$, $S_3/R_3$ is used in a CMP gather to form a stack. The number of traces is known as the fold, f, of the CMP 6.

Figure 4:
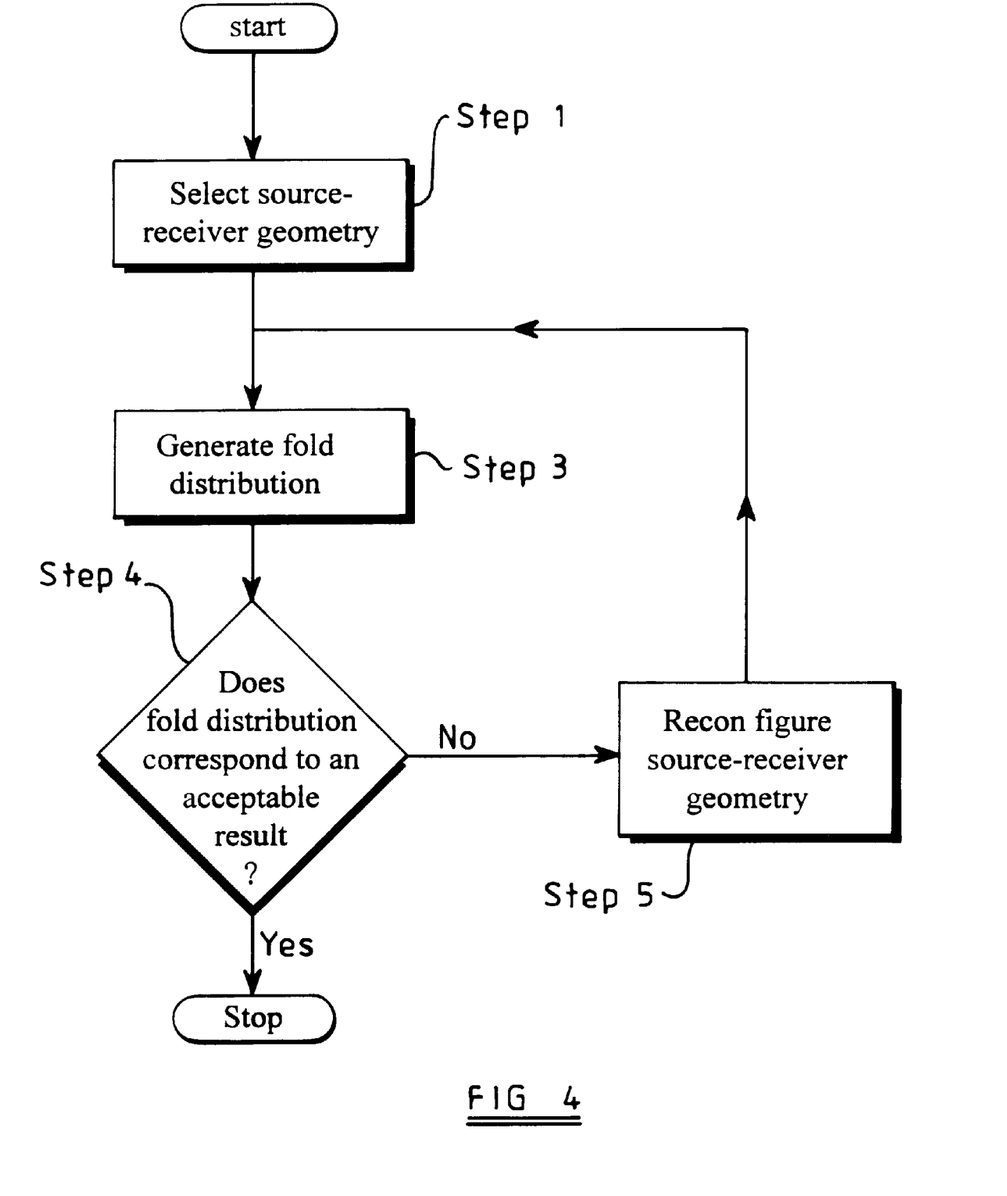
FIG. 4 shows a general process for the methods illustrated in FIGS. 1 and 7.

Referring to FIG. 4, in order to ascertain the quality of the seismic data obtainable from the sources and receivers located on the surface of the survey area 2, the source and receiver geometry is firstly selected (Step 1). A distribution 8 corresponding to the variation of fold values with changes in angle of dip θ is then generated (FIG. 4) (step 3).

Figure 5:
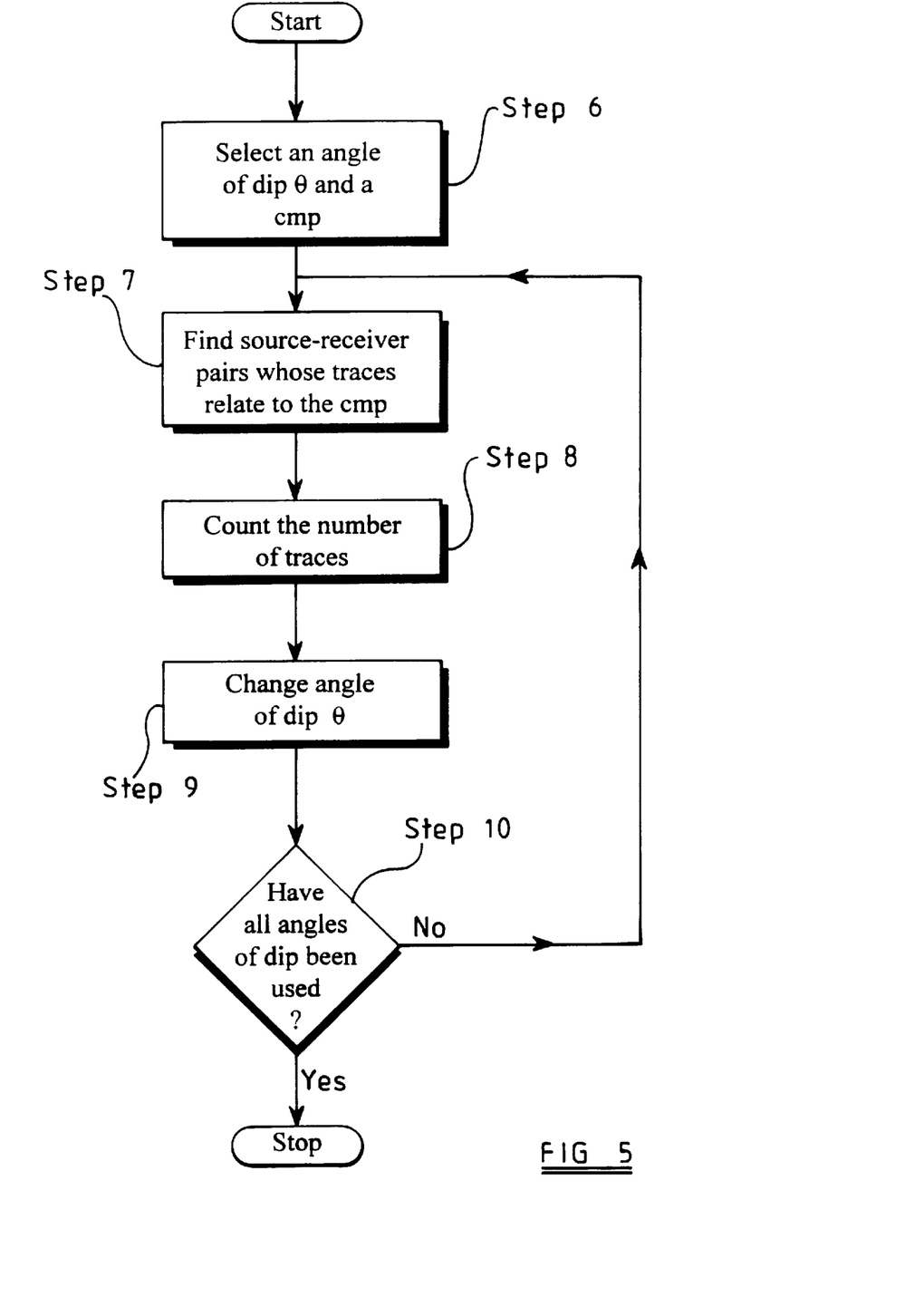
FIG. 5 shows a process step of FIG. 4 in greater detail.

The stop 3 is shown in more detail in FIG. 5. From the selected geometry (step 1), an arbitrary angle of dip θ and a CMP 6 on the dipping reflector 4 are selected (step 6). The source-receiver pairs whose reflection points contribute to the CMP 6 are identified (step 7), for example, $S_1/R_1$, $S_2/R_2$, $S_3/R_3$. The number of traces which contribute to the selected CMP 6, or fold f, is determined (step 8). The angle of dip θ is then varied (Step 9) and the process is repeated until the process has been carried out for all angles of dip θ between 0° and 180° (step 10).

The fold distribution is then analysed in order to determine the quality of the seismic data obtained using the selected source-receiver geometry (step 4).

Figure 2:
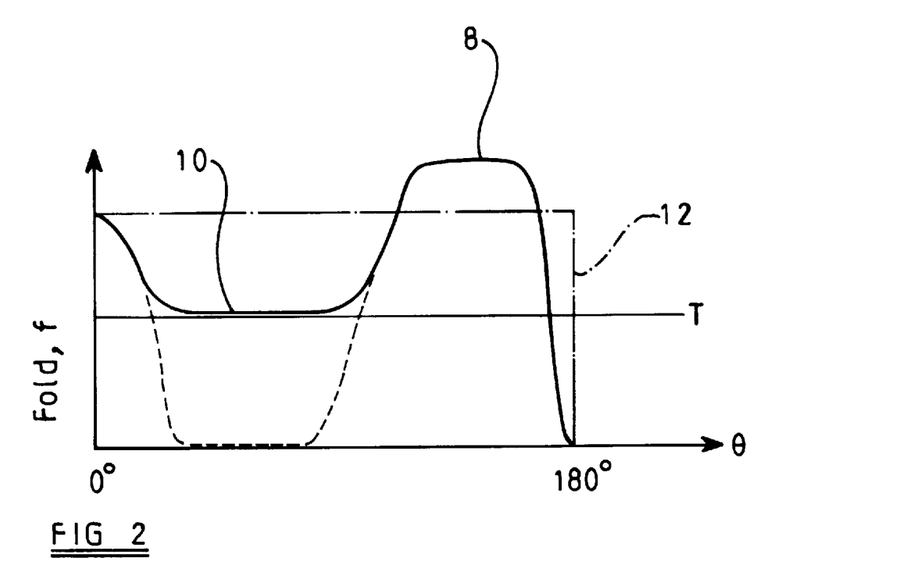
FIG. 2 shows a fold distribution for the survey of FIG. 1.
Figure 3:
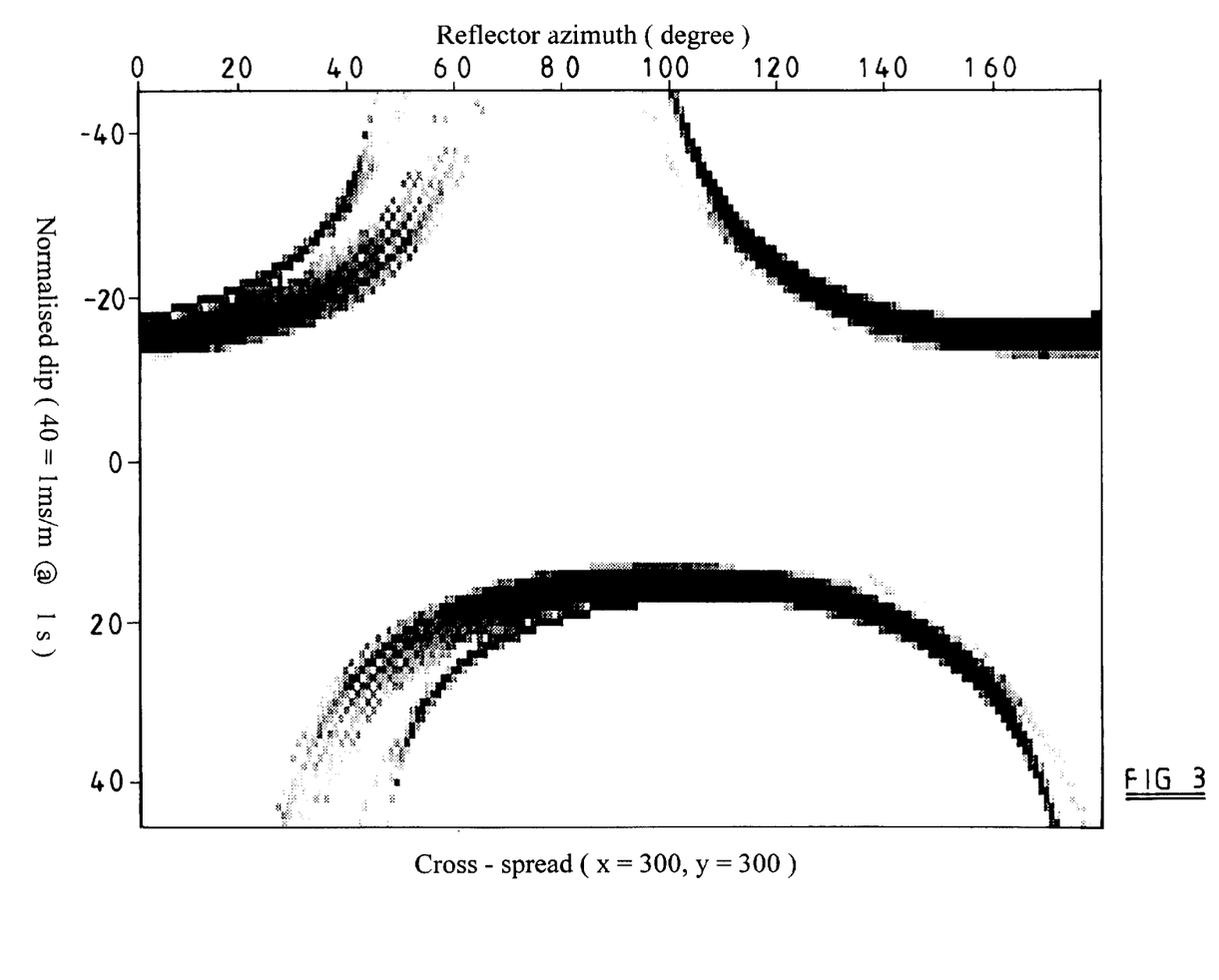
FIG. 3 shows a graphic representation of a DDCS for a three dimensional (3D) survey area according to an embodiment of the present invention, the regions of darker shading representing high folds.

Referring to FIG. 2, the fold distribution 8 or spectrum provides an indication of shadow zones, i.e. CMPs which are not covered by the selected geometry. It is desirable to obtain a uniform fold distribution 12. However, in practice, this is not usually possible. Nevertheless, it is usually desirable to obtain fold distributions having a minimum value 10 above a predetermined acceptable threshold, T, corresponding to the quality of the seismic data obtained.

Figure 6:
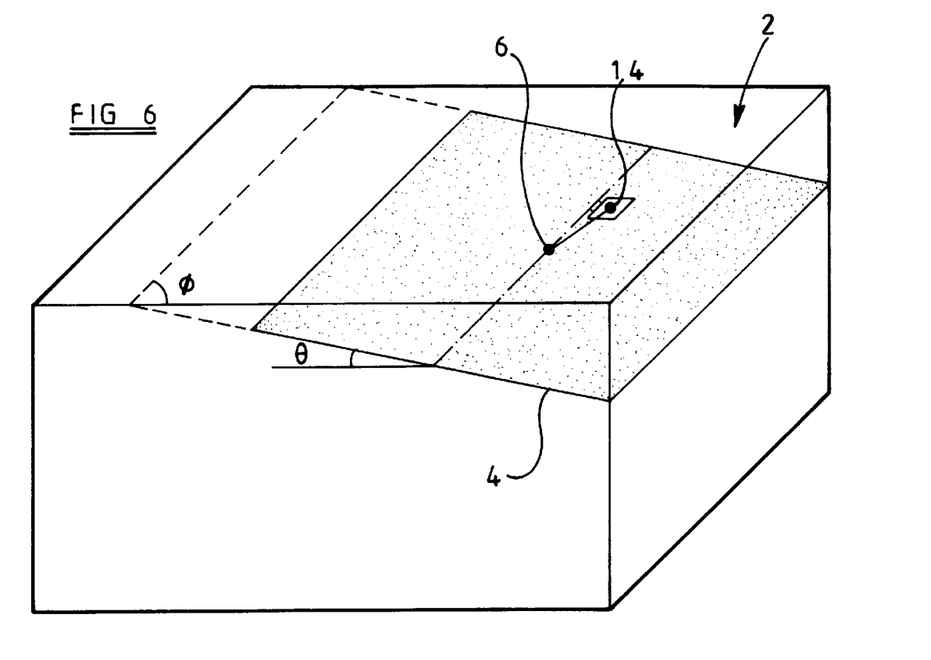
FIG. 6 illustrates a 3D land survey area.
Figure 7:
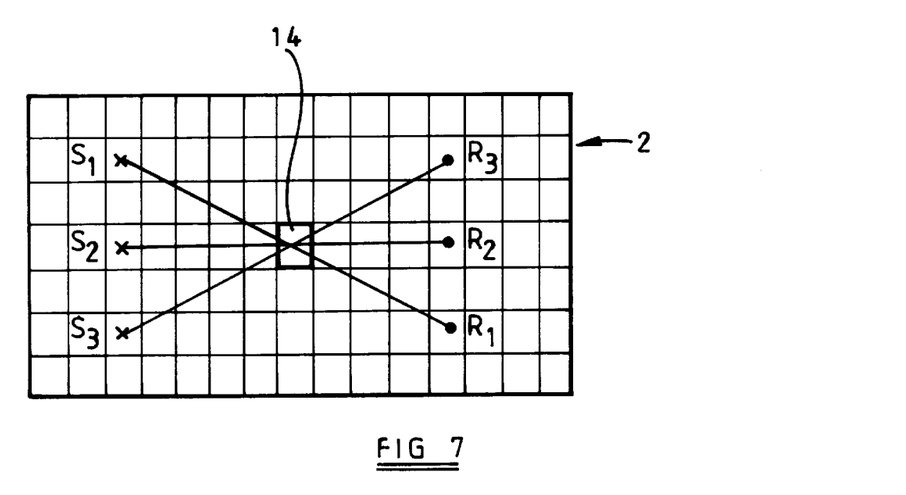
FIG. 7 shows a plan view of FIG. 6.

Extending the above process to a 3D land survey as shown in FIGS. 6 and 7, the survey area 2 is binned. Each bin is typically 25 m by 25 m, but smaller bins can be used for higher resolution, such as 12.5 m by 12.5 m. The dipping reflector 4 is located beneath the survey area 10 and has an angle of dip θ and a strike Φ. The strike Φ is the angle between the line along which the dipping plane 4 intersects the surface of the survey area 2 and a datum or reference direction of the survey along the surface.

Referring to FIG. 4, the same general process applies for determining the quality of the seismic data which can be acquired using a selected source-receiver geometry. Firstly, the source receiver geometry is selected (step 1). From the acquired seismic data, a fold distribution is determined (step 3). The computation of the fold distribution differs slightly from the 2D example described above, since each point of the 3D dipping surface is characterised by the strike φ as well as the angle of dip θ.

The fold distribution is then analysed to ascertain the quality of the acquired seismic data. The criterion for determining, from the fold distribution, the acceptability seismic data is as described above with reference to the 2D example. If the quality of the acquired data is not acceptable, the source-receiver geometry is reconfigured (step 5) and evaluated (steps 2 to 4).

Figure 8:
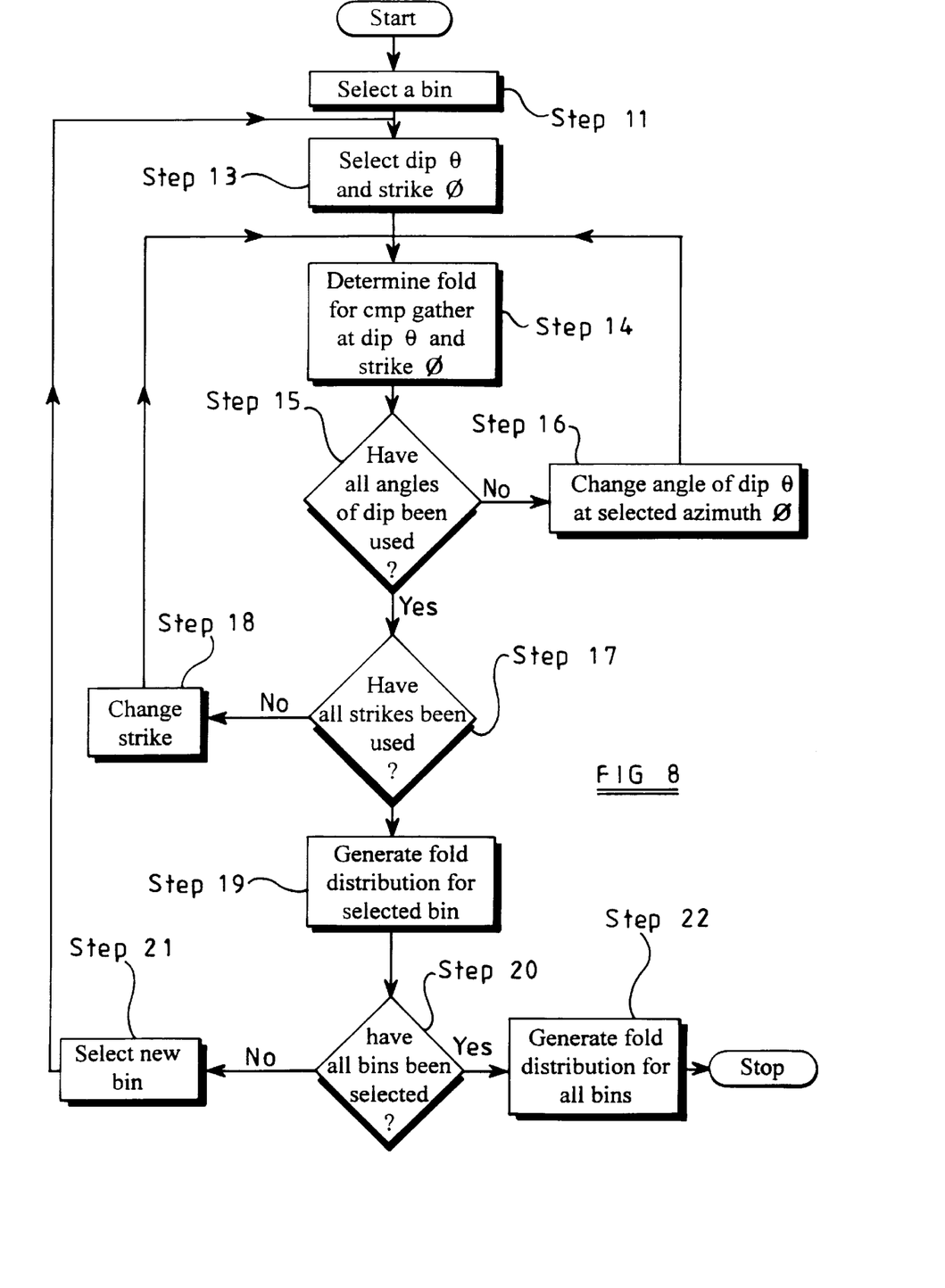
FIG. 8 shows a step of FIG. 4 in greater detail for the area of FIGS. 6 and 7.

The step 3 is shown in more detail in FIG. 8. A bin 14 is selected for processing (step 11). A first angle of dip θ and a first strike Φ are selected (step 13). The traces which contribute to the CMP gather 6 having a depth, d, within the bin 14 are identified and the corresponding fold determined (step 14).

It is then verified that the fold has been determined for all angles of dip θ in a first predetermined range for a selected strike Φ. If this is not the case, the angle of dip θ is changed and a new fold is calculated for the new angle of dip θ. Once folds have been determined for all angles of dip θ in the first predetermined range, it is verified that folds have been calculated for all strikes Φ in a second predetermined range. If this is not the case, the strike Φ is changed and steps 14 to 16 are repeated for all angles of dip θ in the first predetermined range.

Once folds have been determined for all strikes Φ in the second predetermined range, a fold distribution is compiled, the distribution comprising the fold for the given CMP gather 6 over the first predetermined range of angles of dip θ and over the second predetermined range of strikes φ of the dipping reflector 4.

The above process (steps 13 to 19) is repeated until fold distributions have been determined for all the bins 14 in the survey area 2 (steps 20 and 21). A fold distribution is then determined for all bins 14 in the survey area 2 over the first predetermined range of angles of dip θ and the second predetermined range of strikes Φ. The axes of the fold distribution for all bins therefore correspond to angle of dip θ, strike Φ and fold, $f_{θφ}$.

In an example of a second embodiment of the present invention, a subsurface comprises a dipping reflector 4 which gives rise to a reflection event $t_0$ (analogous to depth, d, in the previous example) at a CMP location, in respect of which it is desired to calculate a DDCS. If, however, the strike of a source-receiver pair is known, for example, as described in U.S. Pat. No. 5,450,370, the contents of which are incorporated herein by reference, it is possible to convert the source-receiver strike data to obtain a fold distribution of the type described above.

It is known that DMO is a correction process for moving all traces contributing to a given CMP location along a line from a source $S_1$ to a receiver $R_1$ (FIG. 6). The traces contributing to the given CMP location are called a DMO panel.

For a particular trace within the DMO panel contributing to the CMP location, a DMO corrected time $t_d$ of the trace at the CMP output location can be calculated using the following equation:

$$t_d = \sqrt{t_0^2 - (rt_0 + (h^2 - r^2)p)^2 / h^2} \quad (1)$$

where h is half the distance of the source-receiver offset, r is the distance between the traces CMP location and the DMO panel location, and p is an apparent time dip of the reflection measured along the source-receiver azimuth. The apparent time dip is related to the apparent dip angle θ by p=sin θ/v, where the apparent dip angle is seen along the actual source-receiver line. The variable $t_0$ is the travel time from the cell centre to the reflector and back. It is possible to arrive at equation (1) from basic DMO principles by means of algebraic manipulation.

The DMO corrected time of the trace is equal to the two-way time. Thus, the trace contributes to the imaging of the dipping reflector 4 by constructive interference if the following condition is met:

$$\frac{p}{t_0} = -\frac{r}{h^2 - r^2} \quad (2)$$

Equation (2) relates the apparent dip, p, (normalised by the two-way time) to the half-offset, h, and distance, r. It should be noted that, due to the negative sign on the right hand side of equation (2), a positive dip can only be imaged by a trace having a negative distance from the output location, and vice versa. Therefore, for 3D data, positive/negative dips and distances have to be clearly defined.

An actual time dip of the dipping reflector, $p_0$, can be determined from the apparent dip, p, by means of the following equation:

$$p_0 = \frac{p}{\cos(\phi - \phi_0)} \quad (3)$$

where $\Phi$ is the source-receiver azimuth and $\Phi_0$ is the strike of the dipping reflect. A relationship therefore exists between the apparent dip, p, (normalised by the two-way time) and the structural dip, $p_0$, by virtue of equation (3).

Figure 9:
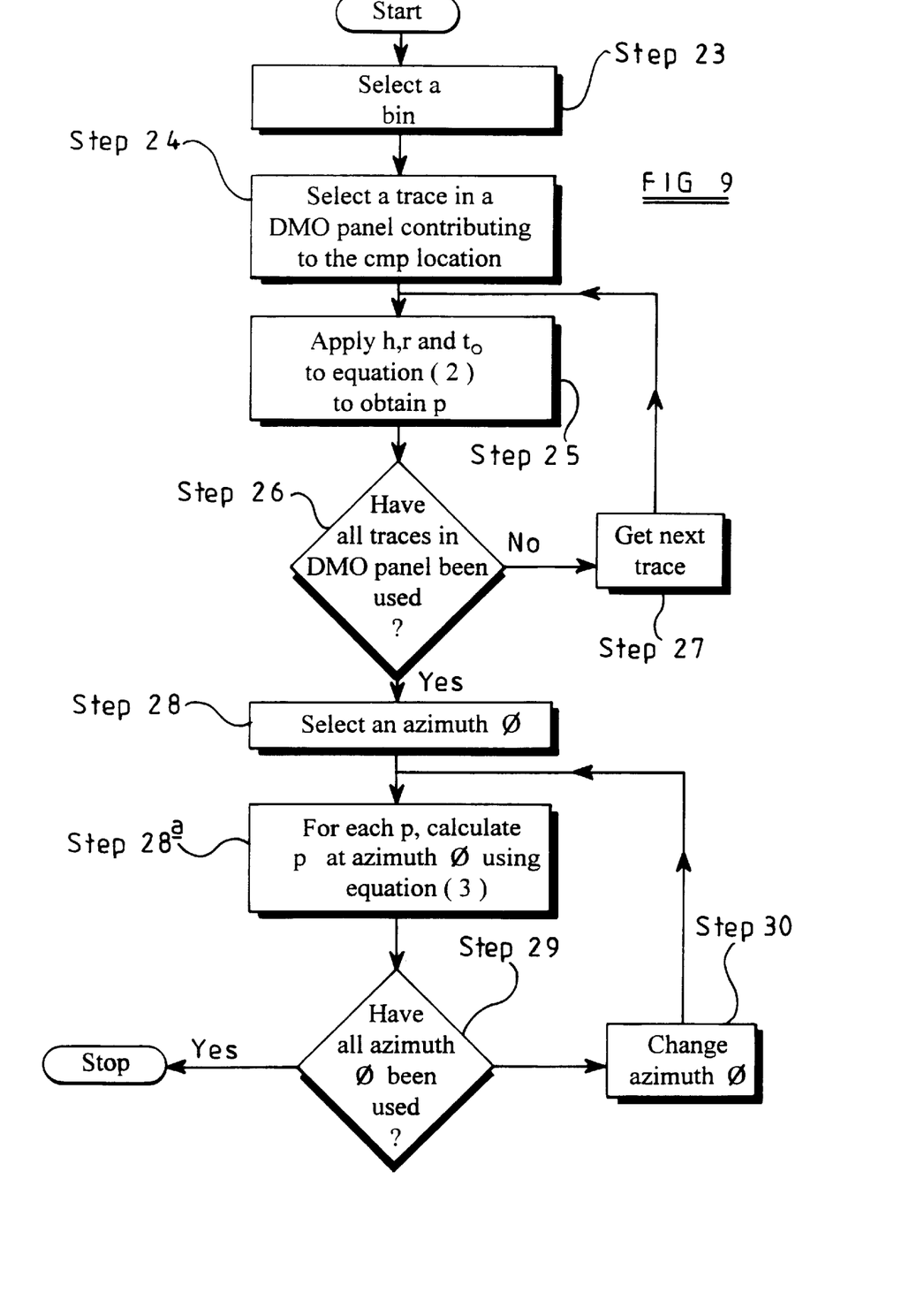
FIG. 9 shows a process for another embodiment according to the present invention.

Referring to FIGS. 7 and 9, the invention will now be described with reference to an arbitrary output bin 14 when the source-receiver azimuth data is available.

In order to determine the DDCS for the arbitrary CMP bin 14 (step 23), the half-offset, h, and the distance of the CMP location from the output CMP location, r, of each trace in the corresponding DMO panel are applied to equation (2) in order to determine the normalised apparent dip, p, for each trace (steps 24 to 27).

With the exception of singularities the actual time dip $p_0$ is determined over all strikes, $\Phi_0$, of the dipping reflector 4 by means of equation (3) (steps 28–30).

The process can be repeated for each bin in the survey area 2 in order to obtain the DDCS for the entire survey area.

In an alternative embodiment of the invention, rather than the requirement that $t_0 = t_d$ it is required that $$|t_d - t_0| < \tfrac{1}{2}f \quad (5)$$

where f is an appropriate centre frequency. In this case, equation (1) requires that the time dip divided by the two-way time must lie in the following interval:

$$\frac{p}{t_0} \in \left[ \left( -\frac{r}{h^2 - r^2} \right) \pm \frac{h}{h^2 - r^2} \sqrt{1 - \left( \frac{2ft_0 - 1}{2ft_0} \right)^2} \right] \quad (6)$$

It will be noted that equation (6) reduces to equation (1) in the high frequency limit.

What is claimed is:

1. A method of generating a fold distribution for a plurality of seismic sources and a plurality of seismic receivers, the method comprising the steps of:
   (i) selecting a Common Mid-Point location;
   (ii) selecting a dip within a first predetermined range and a strike within a second predetermined range;
   (iii) determining the fold for the selected dip and the selected strike at the selected location; and
   (iv) repeating the step (iii) for a plurality of different dips within the first predetermined range and a plurality of strikes within the second predetermined range.

2. A method as claimed in claim 1, further comprising selecting a plurality of different Common Mid-Point locations and repeating the steps (ii) to (iv) for each of the selected locations.

3. A method as claimed in claim 2, in which the selected locations are the centres of a plurality of bins.

4. A method of evaluating a seismic survey, the method comprising the steps of:
   (i) selecting a source-receiver geometry;
   (ii) generating a fold distribution by:
      (a) selecting a Common Mid-Point location;
      (b) selecting a dip within a first predetermined range and a strike within a second predetermined range;
      (c) determining the fold for the selected dip and the selected strike at the selected location; and
      (d) repeating the step (c) for a plurality of different dips within the first predetermined range and a plurality of strikes within the second predetermined range; and
   (iii) evaluating the fold distribution for acceptability.

5. A method as claimed in claim 4, comprising repeating the step (ii) for a plurality of different source-receiver geometries until the step (iii) indicates an acceptable fold distribution.

6. A method as claimed in claim 4, in which the step (iii) comprises comparing each fold of the distribution with a minimum acceptable threshold.

7. A method of generating a fold distribution for a bin corresponding to a DMO panel from the source-receiver geometry of a plurality of seismic traces in the DMO panel, the method comprising the steps of:
   (i) selecting the bin,
   (ii) determining an apparent dip for each of the plurality of seismic traces, and
   (iii) for each apparent dip corresponding to each of the seismic traces, generating an actual dip over a predetermined range of strike directions of the dipping reflector.

8. A method as claimed in claim 7, wherein the apparent dip is determined for each of the plurality of seismic traces using the equation:

$$\frac{p}{t_0} = -\frac{r}{h^2 - r^2}$$

where p is the apparent dip as seen on the source-receiver line, $t_0$ is the zero-offset two-way travel time at the CMP location, h is half the source-receiver distance, and r is the distance of the CMP of the seismic trace to the centre of the bin.

9. A method as claimed in claim 7 wherein the apparent dip is determined for each of the plurality of seismic traces using the equation:

$$\frac{p}{t_0} \in \left[ \left( -\frac{r}{h^2 - r^2} \right) \pm \frac{h}{h^2 - r^2} \sqrt{1 - \left( \frac{2ft_0 - 1}{2ft_0} \right)^2} \right]$$

wherein p is the apparent dip as seen on the source-receiver line, $t_0$ is the zero-offset two-way travel time at the CMP location, h is half the source-receiver distance, f is a centre frequency, and r is the distance of the CMP of the seismic trace to the centre of the bin.

10. A method as claimed in claim 8 wherein the actual dip is generated using the equation:

$$p_0 = \frac{p}{\cos(\phi - \phi_0)}$$

11. A method as claimed in claim 7, wherein the selected CMP location corresponds to the centre of the selected bin.

* * * * *